(12) United States Patent
Rosati

(10) Patent No.: US 6,238,106 B1
(45) Date of Patent: May 29, 2001

(54) AC DRIVE DISPLAY

(75) Inventor: Ramon W. Rosati, Simsbury, CT (US)

(73) Assignee: Warner Electric Technology, Inc., Richmond, VA (US)

( * ) Notice: Subject to any disclaimer, the term of this patent is extended or adjusted under 35 U.S.C. 154(b) by 0 days.

(21) Appl. No.: 08/962,114

(22) Filed: Oct. 31, 1997

(51) Int. Cl.[7] ........................................... H02P 8/00
(52) U.S. Cl. ............................. 395/339; 345/124
(58) Field of Search ................... 345/339, 335, 345/123, 121, 124, 347, 125, 326, 333–334, 336; 707/4

(56) References Cited

U.S. PATENT DOCUMENTS

| | | | |
|---|---|---|---|
| 5,774,109 | * | 6/1998 | Winsky et al. ...................... 345/124 |
| 5,781,193 | * | 7/1998 | Alimpich et al. ................... 345/352 |
| 5,821,932 | * | 10/1998 | Pittore ................................. 345/347 |
| 5,826,257 | * | 10/1998 | Shelling, Jr. ............................ 707/4 |
| 5,920,866 | * | 7/1999 | Crim ................................... 707/100 |

OTHER PUBLICATIONS

Catalog 1336–Plus–1.0, "1336 Plus Adjustable Frequency AC Drive", Allen–Bradley Co., pp. 4–5, Feb. 1997.
Bulletin BR 721, "Series 21H & 22H Line Regen AC Motor Controls", Baldor Electric Co., p. 4, Jun. 1996.
Bulletin #AC/DC–1194–BRO, "Adjustable Speed Drive for AC and DC Motor Control", Danfoss Electric Drives, Div. of Danfoss Inc., pp. 10–11, (copyright 1994).
"GE Drives AF–300B Adjustable Frequency Controller 1/2 through 30hp", General Electric Co., #GEA–11972, dated Oct. 1991.
Bulletin # MEH 374b, "G9 Fuji Inverters Frenic 5000G9 Series", pp. 7–9, 1995.
Bulletin 91–3 101, Fuji Electric Co., Front page.
Hitachi Bulletin # SM–E220T, "Hitachi Adjustable Frequency Control J100 Series", pp. 9–10.
Hitachi Bulletin #SM–E222P, "Hitachi Adjustable Frequency Control J300 Series", pp. 19–21.
Magnetek Drives and Systems, Bulletin 6723, "Magnetek VCD723 AC Vector System Drive", p. 2, (copyright Dec. 1995).
"AC Variable Frequency Drives Product Family 1/20 to 500I HP", L–174–6–C2133–A NA 9605, Mitsubishi Electronics America. Ind. Industrial Automation Div., Mar. 1996.
Brochure XAC ZOM 695, "E–Trac XFC Series Micro–Inverter", TB Wood's Inc. (cover page).
Form 1094A 099515 M, "E–Trac AC Inverter—Installation, Operation and Maintenance Instructions", TB Wood's, Inc., pp. 18–22.
Bulletin 6400CR DC1/250, "Fincor Adjustable Speed AC Motor Controllers for Overhead Material Handling Applications"—Model 6400CR, p. 5.
Bulletin UNID.BR.04.96, "UNIDRIVE Digital AC Drives 1–1000HP", Cover page and p. 5.
Bulletin UNID.PB.08.96, "UNIDRIVE Digital AC Motor Control", Cover page.

* cited by examiner

*Primary Examiner*—Steven Sax
(74) *Attorney, Agent, or Firm*—Dykema Gossett PLLC

(57) ABSTRACT

A motor system controller and a method of operating the controller are provided that enable automatic (i.e., without further user intervention), sequential display of selected parameter values. The controller includes a memory that stores a plurality of operating parameters associated with the motor system controller and a computer program. The controller also includes a user interface having an operator keypad and a liquid crystal display. The operator keypad can be used to access the memory and select certain of the operating parameters for sequential display. The computer program then works with the display to automatically, sequentially display values associated with the selected parameters. The method includes the steps of selecting parameters from a plurality of operating parameters associated with the motor system controller and automatically, sequentially displaying values associated with the selected parameters.

18 Claims, 5 Drawing Sheets

AC DRIVE DISPLAY

BACKGROUND OF THE INVENTION

1. Field of the Invention

This invention relates to a motor system controller and, more particularly, to a motor system controller and a method for operating the controller wherein values of user-selected parameters associated with the motor system controller are sequentially displayed without further user intervention.

2. Disclosure of Related Art

It is common in industry today to have a motor system including a controller for generating control signals, a driver for producing excitation signals responsive to the control signals, and a motor responsive to the excitation signals. The controller typically includes a control circuit for generating the control signals, a memory, and a user interface. The user interface allows a user to control generation of the control signals and monitor the performance of the motor system by accessing, modifying, selecting, and displaying, various motor system parameter values or commands.

A conventional user interface for a motor system controller includes an operator keypad and a display. By using the operator keypad, a user can access and/or modify the values of various motor system parameters associated with the motor system controller. Each time a parameter is accessed, its value is displayed on the display of the user interface. The display in a typical user interface is fairly small. Therefore, only one or two parameter values can generally be displayed at one time. When a user wishes to view additional parameter values, the user must actuate the keypad of the interface to step through or otherwise select the various parameter values. Typically, the set of parameter values is quite large. Therefore, the user is required to spend a great deal of time and effort to display the parameter values of interest to the user. This is undesirable when the user wishes to repeatedly view a number of parameter values over a period of time-for example, to see changes as the motor operates. The continuous user input required to access and display those parameter values is burdensome. Moreover, the interval between successive displays of any one parameter value is dependent upon the actuation of keys by the user.

There is thus a need for a motor system controller and a method of operating the controller that will minimize or eliminate one or more of the above-mentioned deficiencies.

SUMMARY OF THE INVENTION

The present invention provides a motor system controller that, once setup, sequentially displays values associated with user-selected parameters without the need for continuing user intervention (e.g., actuation of the keypad).

A motor system controller in accordance with the present invention includes means for selecting first and second parameters from a plurality of operating parameters associated with the controller and means for displaying respective values associated with the first and second Parameters. Importantly, the display means is configured to display the second value automatically (i.e., without further user intervention) after the first value has been displayed.

In a preferred embodiment, the selecting means may comprise an operator keypad located on a user interface of the controller while the displaying means may comprise a liquid crystal display located on the interface. The above-mentioned operating parameters may be stored in a memory associated with the controller.

A method of operating a motor system controller in accordance with the present invention includes four basic steps. The first step involves selecting a first parameter from a plurality of operating parameters associated with the motor system controller. The second step involves selecting a second parameter from the plurality of operating parameters. The third step involves displaying a first value associated with the first parameter. The fourth step involves displaying a second value associated with the second parameter wherein the second value is automatically displayed (i.e., without further user intervention) after the first value is displayed for a predetermined period of time.

One advantage of the present invention is that it allows a user to repeatedly display parameter values of interest without continuous user intervention (i.e., without having to repeatedly actuate a keypad to step through or select from a large number of parameter values that may not be of interest to the user).

A second advantage of the present invention is that it allows a user to view changes in the parameter values over constant intervals of time rather than at intervals that vary responsive to user input.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
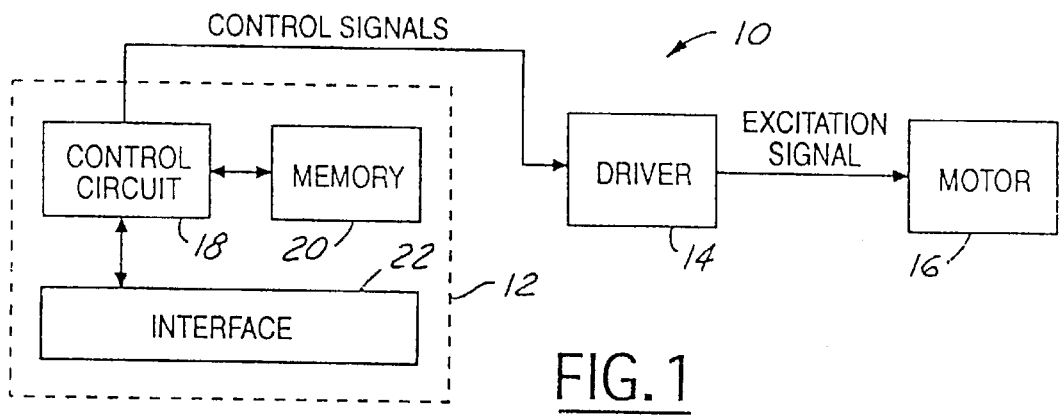
FIG. 1 is a simplified block diagram of a typical motor drive system.

Referring now to the drawings wherein like reference numerals are used to identify identical components in the various views, FIG. 1 illustrates a conventional motor system 10. Motor system 10 includes a controller 12, a driver 14, and a motor 16.

Controller 12 is provided to generate and direct electrical control signals to driver 14. Controller 12 may include a control circuit 18, a memory 20, and a user interface 22 (which is described in greater detail hereinbelow). Control circuit 18 may comprise conventional circuitry well-known in the art and is provided to generate the control signals in response to either a computer program stored in memory 20 or user input through interface 22. Memory 20 may also comprise a device that is conventional in the art and is provided to store computer programs (i.e., software) and data used to control motor system 10. In particular, memory 20 is used in a preferred embodiment to store control elements used in implementing the present invention, namely, a scrolling program and a data structure that includes both parameters associated with controller 12 and a scroll enable flag—all of which is described in greater detail hereinbelow.

The operation of controller 12 may be directed by a controller program (not shown) that may be stored within memory 20 of controller 12. The controller program may, for example, direct control circuit 18 to perform the following functions: read data from and store data to a memory, such as memory 20; modify data; and output data to interface 22 or to another means of displaying data. Preferably, each of these actions is taken with the intent to affect the operation of motor 16.

Driver 14 is provided to generate electrical excitation signals, responsive to the control signals produced by controller 12, to generate mechanical motion in motor 16. Driver 14 may be integrated with controller 12 (i.e., within the same housing) or may exist independently of controller 12 (as illustrated). Driver 14 may also comprise conventional circuitry well-known in the art, typically comprising a plurality of solid-state switches and other electrical components.

Motor 16 may be provided for a wide variety of industrial and other applications. Motor 16 is conventional in the art, and may take any one of a plurality of well-known forms. In a constructed embodiment, motor 16 comprises an AC induction motor.

Figure 2:
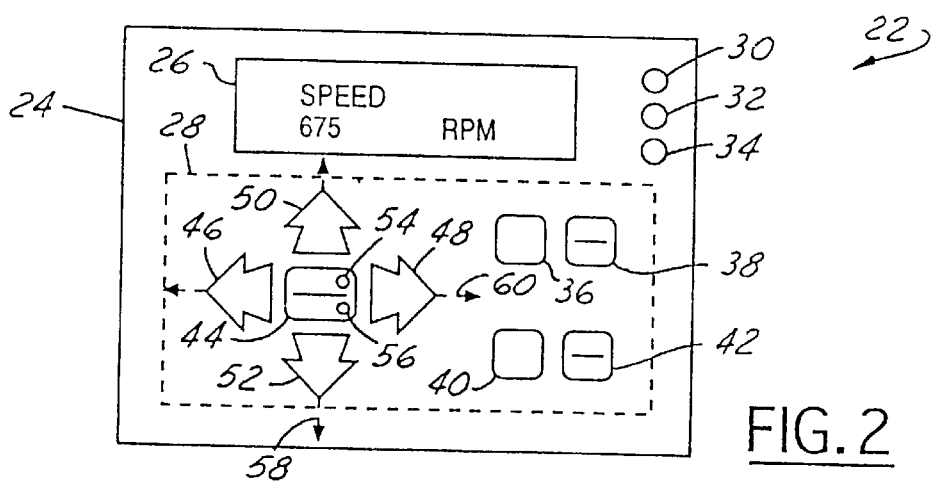
FIG. 2 is a plan view of one embodiment of a user interface for use with the present invention.

Referring now to FIG. 2, interface 22 will be described in greater detail. Interface 22 is provided to allow a user to control the generation of control signals from control circuit 18 and to evaluate the performance of motor system 10 by accessing, modifying, selecting and displaying various motor system parameter values or commands. Interface 22 may be electrically connected to control circuit 18 and memory 20 by wires or similar means. Interface 22 may be integral with the other components of controller 12—control circuit 18 and memory 20—or it may be a freestanding unit having its own housing. In the latter case, which is illustrated in FIG. 2, interface 22 would have a cable (not shown) extending from the housing to connect it to control circuit 18 and memory 20.

As illustrated in FIG. 2, interface 22 may include a housing 24, a display 26, and an operator keypad 28. Interface 22 may also include its own memory (not shown) and LEDs 30, 32, 34, that may be used to indicate, for example, that motor 16 is being run in the forward or reverse direction or that a fault has been detected by controller 12.

Housing 24 is provided as a means for mounting display 26, keypad 28, and an electronic control circuit card (not shown). Housing 24 is also provided to protect the internal electronic components of interface 22 from external objects, such as fingers, screwdrivers, etc. and elements, such as liquids or temperature. Housing 24 may be made of a conventional material such as metal or plastic.

Display 26 is provided to display either data, such as parameter values or designations associated with motor system 10 and controller 12, or commands stored in a memory, such as memory 20, and is mounted to housing 24 (e.g., within or on housing 24). In accordance with the present invention, display 26 is provided as a means for automatically, sequentially displaying a first value and a second value associated with a first parameter and a second parameter, respectively, selected by a user of controller 12. Display 26 may be a two-line, sixteen character spaces per line, liquid crystal display (LCD). It should be understood, however, that display 26 may have a greater or lesser number of lines and/or character spaces. It should also be understood that display 26 may comprise a conventional LED display or vacuum-fluorescent display.

Keypad 28 is provided to allow a user to operate controller 12 by accessing memory 20, selecting or modifying parameter values or commands stored in memory 20, and directing interface 22 to display those values or commands on display 26. In accordance with the present invention, keypad 28 is provided as a means for selecting a first parameter and a second parameter from a plurality of operating parameters associated with controller 12. Keypad 28 may comprise a conventional membrane-type keypad and may include function keys 36, 38, 40, 42, 44, and control keys 46, 48, 50, 52. Actuation of any one of the keys of keypad 28 may in turn cause the execution of an interface program (i.e. software) that may be programmed into a memory of interface 22 (not shown) or memory 20 of controller 12. Like the controller program of controller 12, the interface program may, for example, direct interface 22 to perform the following functions: read data from and store data to a memory, such as memory 20; modify data; and output data to a display, such as display 26. Actuation of one of control keys 46, 48, 50, 52, may also cause the execution of a scrolling program in accordance with the present invention.

Function keys 36, 38, 40, 42, are provided to allow a user to operate controller 12 and thus direct the operation of motor system 10 in a conventional fashion. Actuation of function keys 36, 38, 40, 42, may cause a computer program, such as one of the above-mentioned controller or interface programs or the below-described scrolling program, to be executed from a memory, such as memory 20. In the illustrated embodiment, function key 36 is used to "jog" motor 12 (hereinafter "jog" key 36), function key 38 is used to toggle the operation of motor 16 between a forward direction and a reverse direction (hereinafter "fwd/rev" key 38), function key 40 is used to run motor 16 (hereinafter "run" key 40), and function key 42 is used to stop motor 16 and, alternatively, to reset controller 12 after a fault condition (hereinafter "stop/reset" key 42). To "jog" motor 16, the user first actuates "jog" key 36 and then actuates "run" key 40. Normally, actuation of "run" key 40 causes motor 16 to run continuously until the user stops motor 16 by, for example, actuating "stop/reset" key 42 However, if "jog" key 36 is actuated prior to actuating "run" key 40, motor 16 will run only as long as "run" key 40 is depressed by the user.

Function key 44 is provided to toggle the operation of control keys 46, 48, 50, 52. Actuation of function key 44 alternately enables control keys 46, 48, 50, 52, to perform at least two different functions. For example, actuation of function key 44 may enable control keys 46, 48, 50, 52, to alternately access a parameter value in memory 20 and modify that parameter value. Function key 44 is also provided to "mark" parameter values that are selected by a user for sequential display in accordance with the present invention. Function key 44 may include a pair of LEDs 54, 56, to indicate to a user whether control keys 46, 48, 50, 52, are currently enabled to perform a first function or a second function. LEDs 54, 56, may form a part of function key 44 or may be disposed near function key 44 on housing 24.

Control keys 46, 48, 50, 52, are provided to perform a number of functions including a first function, such as accessing and selecting a parameter in memory 20, and a second function, such as modifying a value associated with that parameter. In accordance with the present invention, control keys 46, 48, 50, 52, are provided to access and modify a scroll enable flag in memory 20 and also to activate a scrolling program in memory 20. In the illustrated and preferred embodiment there are four control keys 46, 48, 50, 52. However, fewer or additional control keys may be used depending upon the requirements of the user or application.

Control key 46 is disposed on one side of an axis 58 extending through function key 44. Control key 48 is disposed on an opposing side of axis 58. Control key 50 is disposed on one side of an axis 60 extending through function key 44. Control key 52 is disposed on an opposing side of axis 60.

Figure 3:
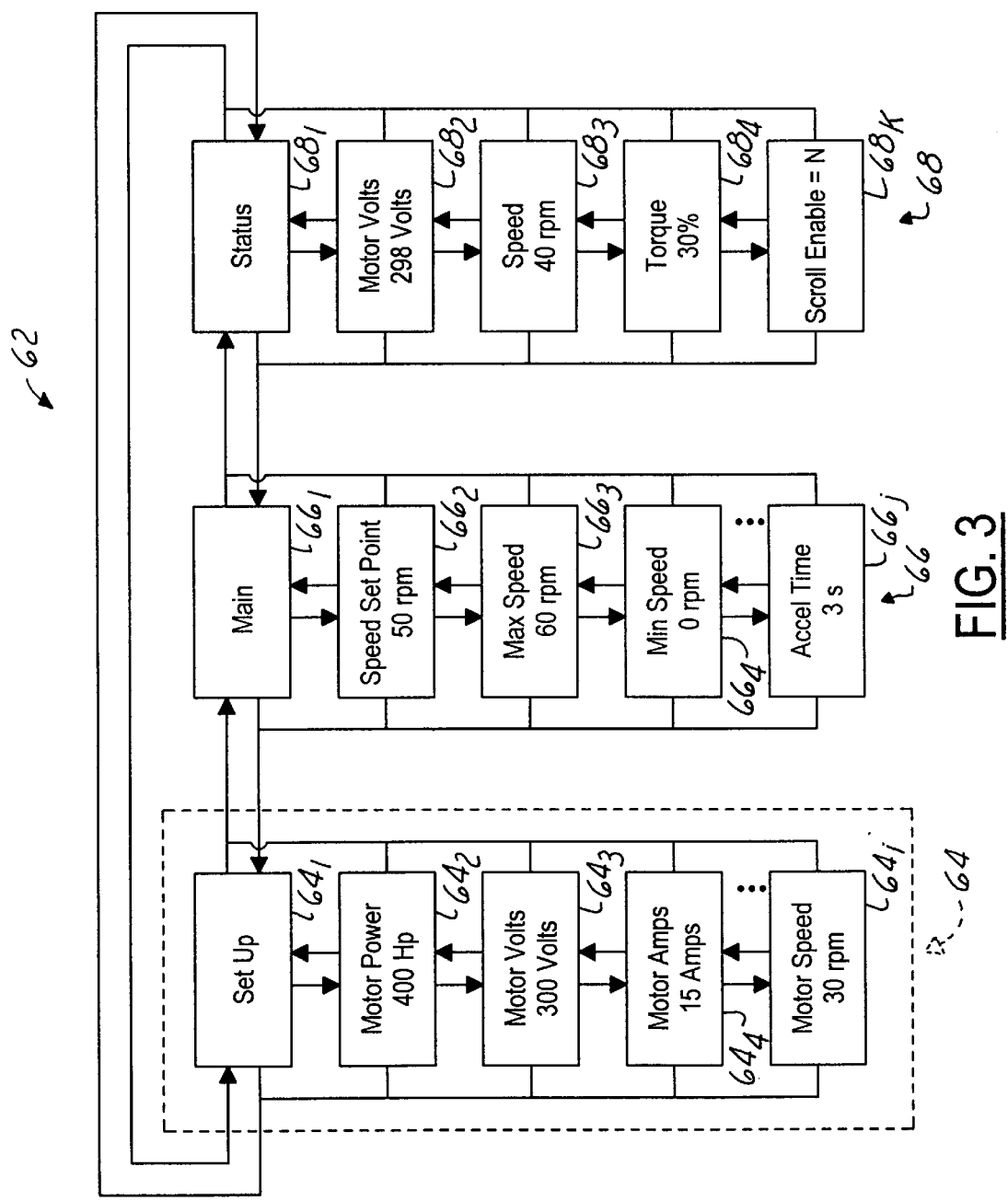
FIG. 3 is a diagram representing a data structure for use with the present invention.

Referring now to FIG. 3, a data structure 62 for use in, and in accordance with, the present invention is illustrated. Data structure 62 is stored in a memory, such as memory 20, and provides a logical arrangement for parameter values associated with motor system 10 and controller 12. Within data structure 62, the parameter values are organized into a plurality of menu groups. In the illustrated embodiment data structure 62 includes a first menu group 64, a second menu group 66, and a third menu group 68. It should be understood, however, that data structure 62 may have more or fewer menu groups than the three menu groups illustrated. Menu group 64 primarily includes parameter values that are necessary to configure motor system 10. Menu group 66 includes those parameter values that are most frequently accessed and modified by the user. Finally, menu group 68 primarily includes measured parameter values of motor system 10 (i.e., values that are not set by the user, but that are measured by sensors or other means within motor system 10). Menu group 68 is used to provide the user with information as to the performance and operation of motor system 10.

Each menu group 64, 66, 68, has a plurality of elements designated $64_1, 64_2, \ldots 64_i, 66_1, 66_2, \ldots 66_j$ and $68_1, 68_2, \ldots 68_k$, respectively. The contents of any element may be displayed on display 26 of interface 22 as a plurality of characters. It should be understood that "characters" as herein used includes, but is not limited to, alphabetical characters, numerical characters, and symbolic characters (e.g., '*' or '?'). Each element may contain, for example, one or more of the following: a parameter group title (e.g., "Setup", "Status"), a parameter designation (e.g., "speed", "acceleration"), a numerical parameter value, or a unit designation (e.g., "amps", "rpm"). In the illustrated embodiment, the first element $64_1, 66_1, 68_1$, in each parameter group 64, 66, 68, respectively, contains a parameter group title. Each subsequent element $64_2 \ldots 64_i, 66_2 \ldots 66_j, 68_2 \ldots 68_k$, of the parameter groups 64, 66, 68, respectively, contains a parameter designation, a parameter value, and a unit designation-except for element $68_k$ as detailed below. It should be noted, however, that the elements of data structure 62 may contain other items, such as the controller program mentioned hereinabove or the scrolling program described hereinbelow. It should also be understood that, although menu groups 64, 66, 68, are illustrated as having five elements, the particular number of elements in any one of menu groups 64, 66, 68, may vary.

Element $68_k$ of data structure 62 includes a scroll enable flag. The scroll enable flag may be located in any element of data structure 62, but is preferably located within menu group 68. In accordance with the present invention, the scroll enable flag is provided to allow a user of controller 12 to initiate a process of selecting and sequentially displaying a plurality of parameter values within menu group 68.

As mentioned hereinabove, the contents of any element of data structure 62 may be displayed on display 26 of interface 22 as a plurality of characters. In general, display 26 will display the contents of the most recently accessed element of data structure 62. The contents of each element of each menu group of data structure 62 are accessed and, consequently, displayed on display 26 by actuation of function key 44 and control keys 46, 48, 50, 52. As illustrated in FIG. 3 (wherein the left, right, up, and down arrows correspond to control keys 46, 48, 50, and 52, respectively), data structure 62 is organized so that a user can move from one of menu groups 64, 66, 68, to another of menu groups 64, 66, 68, by actuating one of control keys 46, 48. Data structure 62 is further organized so that a user can move within one of menu groups 64, 66, 68, by actuating one of control keys 50, 52.

Figure 4:
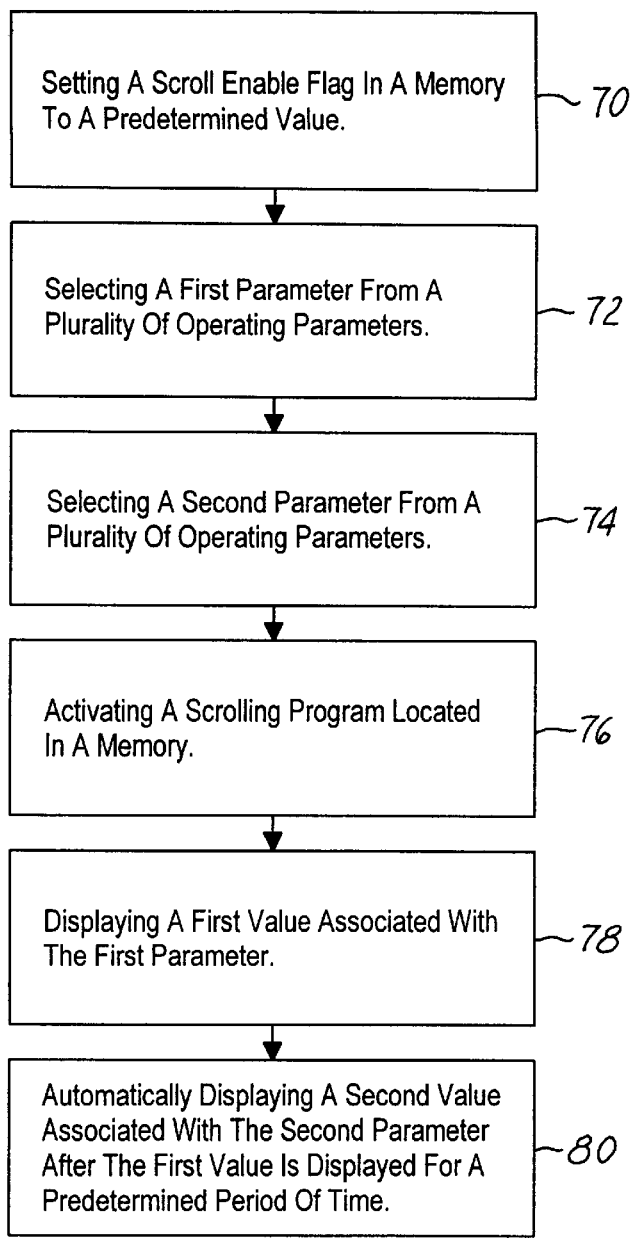
FIG. 4 is a flowchart diagram illustrating a method of operating a motor system controller in accordance with the present invention.
Figure 5:
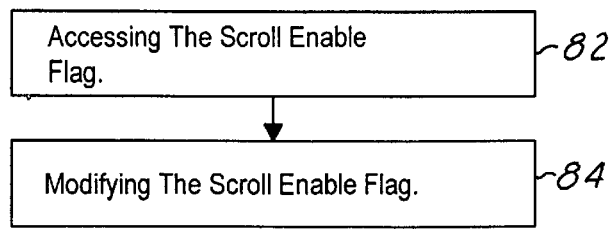
FIGS. 5–6 are flowcharts diagram illustrating, in greater detail, the method steps shown in FIG. 4.

Referring now to FIGS. 4–9, a method of operating controller 12 in accordance with the present invention will be described. FIG. 4 shows a flowchart diagram illustrating a method of operating controller 12 according to the present invention. The method includes steps 70, 72, 74, 76, 78, and 80. Step 70 involves setting the scroll enable flag in menu group 68 to a predetermined value. As shown in FIG. 5, performance of step 70 may include a pair of substeps 82, 84. Substep 82 involves accessing the scroll enable flag in memory 20. Substep 84 involves modifying the scroll enable flag to a predetermined value.

Figure 7:
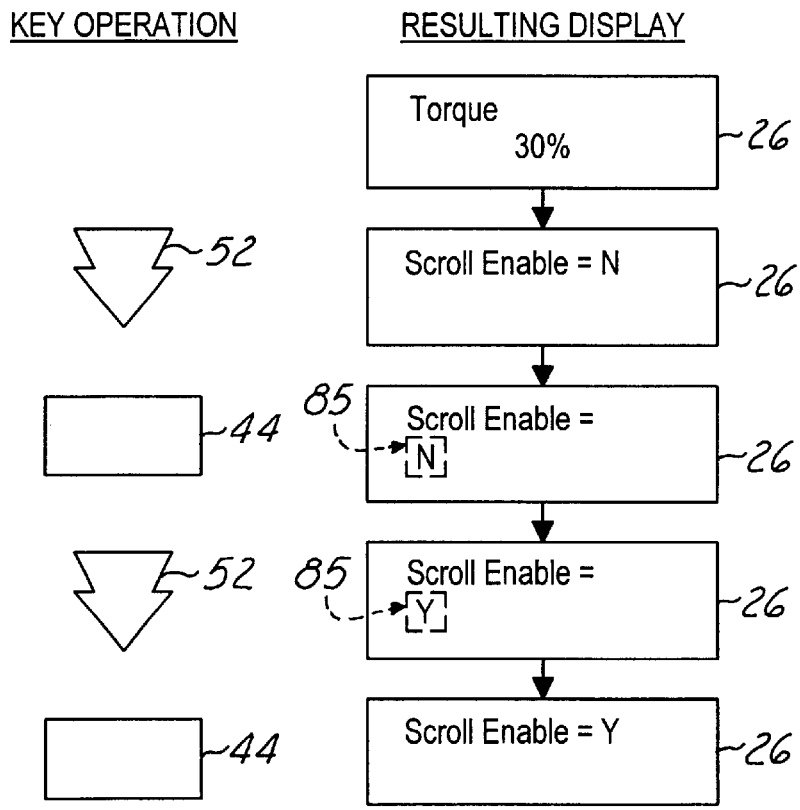
FIGS. 7–9 are plan views of the display area of the user interface of FIG. 2 illustrating the selection and sequential display of a plurality of parameter values in response to the actuation of keys on the interface.

Referring now to FIG. 7, performance of step 70 (and substeps 82 and 84) is shown with reference to a series of screen displays on display 26 in response to user input through function key 44 and control keys 46, 48, 50, and 52 of keypad 28. As illustrated in FIG. 7, a user begins step 70 by accessing the scroll enable flag (step 82). This is accomplished by actuating one of control keys 46, 48, 50, 52. Depending upon the location of the scroll enable flag within data structure 62 and the location of the element within data structure 62 being accessed by the user, a plurality of control keys 46, 48, 50, 52, may have to be actuated or one of the control keys may have to be actuated a plurality of times to access the scroll enable flag. In the example illustrated in FIG. 7, however, the user is accessing element $68_4$ of data structure 62 while the flag is located within element $68_k$. Therefore, a user would only need to actuate control key 52 in order to access the flag.

Once the user has accessed the scroll enable flag, the user may modify the flag to set it to a predetermined value (step 84). As mentioned hereinabove, actuation of function key 44 enables control keys 46, 48, 50, 52, to alternately perform a first function and a second function. In the illustrated embodiment, the first function is to access the scroll enable flag as described in the preceding paragraph. The second function is to modify the flag. Therefore, to modify the scroll enable flag, a user of interface 22 would actuate function key 44 to enable control keys 46, 48, 50, 52, to modify the flag. Actuation of function key 44 also causes a cursor 85 to appear in the display as indicated in FIG. 7. After actuating function key 44, the user would actuate one of control keys 50 and 52 to modify the value of the flag to a predetermined value. In a constructed embodiment, the scroll enable flag is capable of assuming two values corresponding to: (1) the display of character 'Y' indicating that sequential display of selected parameter values is desired; and (2) the display of character 'N' indicating that sequential display is not desired. In the example illustrated in FIG. 7, the predetermined value is a value corresponding to display of character 'Y' and the user actuates one of control keys 50 or 52 to modify the value of the scroll enable flag from a value corresponding to display of character 'N' to the value corresponding to display of character 'Y'. Finally, the user would actuate function key 44 once again to set the new value for the scroll enable flag.

Figure 6:
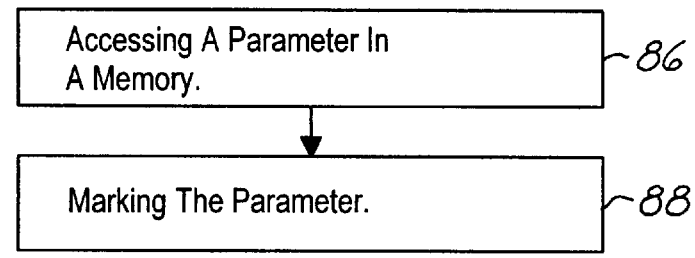

Referring again to FIG. 4, steps 72 and 74 of the inventive method involve selecting a first parameter and a second parameter, respectively, from a plurality of operating parameters associated with controller 12. As shown in FIG. 6, either of steps 72 and 74 may include a pair of substeps.

Substep 86 involves accessing a parameter stored within menu group 68 in memory 20. Substep 88 involves marking the parameter via actuation of keypad 28 with an indicator to signify the parameter's selection by the user.

Figure 8:
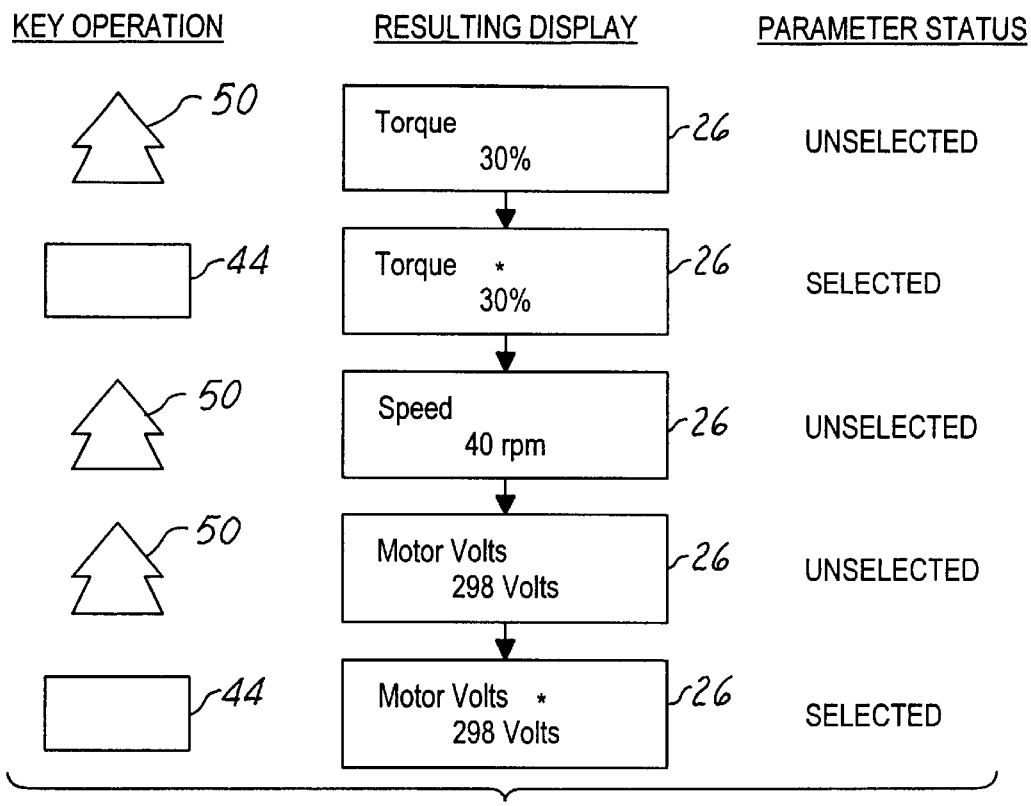

Referring now to FIG. 8, performance of steps 72 and 74 (and substeps 86 and 88 of steps 72, 74) is shown with reference to a series of screen displays on display 26 in response to user input through function key 44 and control keys 46, 48, 50, and 52 of keypad 28. In particular, FIG. 8 shows the selection of a first parameter, "Torque", and a second parameter, "Motor Volts". A user begins selecting the first parameter (step 72) by accessing the parameter (step 86). In the illustrated embodiment, the operating parameters are arranged with a data structure 62 of memory 20 and, in particular, within menu group 68 of data structure 62. A user accesses one of the parameters by actuating at least one of control keys 46, 48, 50, 52. The example illustrated in FIG. 8 assumes that the user has just set the scroll enable flag in element $68_k$ as previously described with reference to FIG. 7. Therefore, the user would actuate control key 50 once to access element 684 which contains the first parameter ("Torque"). Once the user has accessed the first parameter, the user completes its selection by marking the parameter (step 86) with an indicator (not shown) via actuation of function key 44. As illustrated in FIG. 8, actuation of function key 44 also causes an asterisk ("*") to appear in the display to indicate to the user that the parameter has been marked. The user selects the second parameter (step 74) in the same manner. Because the second parameter ("Motor Volts") is in element $68_2$, however, the user would actuate control key 50 twice and then function key 44 as illustrated. It should be understood that any number of parameters within menu group 68 could be selected for sequential display in a similar manner. Typically, menu group 68 will include a much longer list of parameters to select from and, in a constructed embodiment, a user is able to select up to five parameters for sequential display.

Referring again to FIG. 4, step 76 of the inventive method involves activating a scrolling program stored in memory 20. The scrolling program comprises a set of program steps (i.e., software) that is stored within a memory, such as memory 20, and that, in conjunction with control circuit 18 and display 26 of interface 22, generate an automatic, sequential display of parameter values previously selected by the user. Although the scrolling program could be activated in a number of ways and responsive to various inputs, the scrolling program in a constructed embodiment is designed to be activated once the scroll enable flag has been set to the predetermined value (corresponding to the display of 'Y' in the illustrated embodiment) and at least one of control keys 46, 48, 50, 52, has been actuated. In particular, once the scroll enable flag is set to the predetermined value, control keys 46, 48, 50, and 52, are actuated in the following manner: first, one of control keys 46, 48, is actuated one or more times to access another menu group (i.e. a menu group other than menu group 68); second, one of control keys 46, 48, is actuated one or more times to once again access menu group 68 (which results in access of element $68_1$); and, finally, one of control keys 50, 52, is actuated to access an element within menu group 68—other than element $68_1$.

The final steps 78, 80 of the inventive method involve displaying a first value associated with the first parameter selected by the user and then automatically (i.e., without further user intervention) displaying a second value associated with the second parameter selected by the user once the first value is displayed for a predetermined period of time. The predetermined time period is generally from about 2 seconds to about 6 seconds and is about 3 seconds in a constructed embodiment. However, other time periods could be used. In a constructed embodiment, the predetermined time period is a preset value located within memory 20 of controller 12. It should be understood, however, that the predetermined time period could alternatively be a user-selected value.

Figure 9:
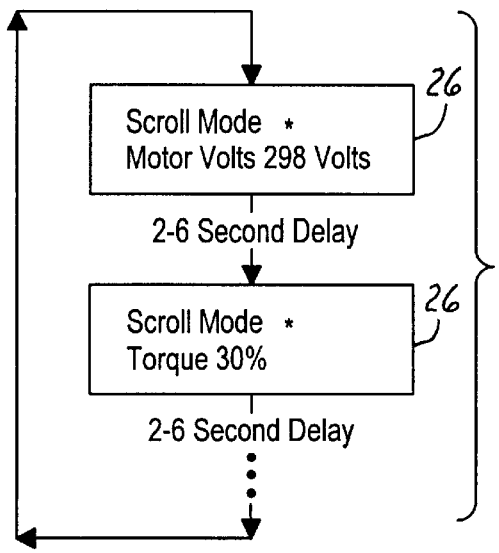

FIG. 9 illustrates the performance of steps 78 and 80 after the selection of first and second parameters, "Torque" and "Motor Volts" (as detailed above with reference to FIG. 8), and the activation of the scrolling program. In particular, activation of the scrolling program causes display 26 to display a value associated with the first selected parameter within menu group 68; in this case, "Motor Volts" in element $68_2$. After a short predetermined time period, display 26 automatically displays the value of the next selected parameter within menu group 68—"Torque" in element $68_4$. If additional elements were selected by the user, display 26 would automatically, sequentially display each of the elements—preferably separated each time by the same predetermined time period. Finally, once every selected element within menu group 68 is displayed, display 26 once again automatically displays the first selected parameter within menu group 68. In the example illustrated in FIG. 9, only two parameters have been selected by the user. Therefore, display 26 displays the value of the first parameter, then automatically displays the value of the second parameter, and then automatically displays the value of first parameter again—each time separated by the same predetermined time period.

It should be understood that the scrolling program could be written so that values for the selected parameters would be displayed in a different order than illustrated in FIG. 9. For example, the scrolling program could direct display 26 to begin by displaying a different selected parameter than the first selected parameter within menu group 68. The scrolling program could also direct display 26 to display the selected parameters in ascending or descending order within menu group 68 or randomly within menu group 68.

To halt the sequential display of selected parameter values, the user can either actuate one of control keys 46 and 48 to leave menu group 68 or the user can actuate function key 44 during the sequential display. In the latter case, actuation of function key 44 enables the user to once again modify the scroll enable flag in the manner described hereinabove.

As described and illustrated, a motor system controller and a method for operating the controller in accordance with the present invention provide the ability to automatically, sequentially display selected parameter values associated with a motor system controller. Such a controller and method accomplish two objectives. First, the ability to automatically, sequentially display selected parameter values results in a significant savings in time and effort for the user. Although menu group 68 is shown in the example as having only a few parameters, a menu group in a conventional motor system controller may have many more. In such a controller, continuous user intervention (e.g., by actuating an operator keypad) is required to repeatedly display parameter values of interest. The present invention enables a user to select the parameters of interest to the user and then to repeatedly and sequentially display values associated with those parameters without the necessity of further user intervention and without having to display other parameter values that may not be of interest to the user. Second, the ability to automatically, sequentially display select parameter values enables the user to view changes in the values at constant intervals rather than at intervals dependent upon user input.

While the invention has been particularly shown and described with reference to the preferred embodiments thereof, it is well understood by those skilled in the art that various changes and modifications can be made in the invention without departing from the spirit and scope of the invention.

I claim:

1. A method of operating a motor system controller having a plurality of operating parameters associated therewith, comprising the steps of:

selecting a first parameter from said plurality of operating parameters using a user interface;

selecting a second parameter from said plurality of operating parameters using said user interface to thereby form a modifiable subgroup of actively displayable parameters;

displaying a first value associated with said first parameter of said subgroup;

automatically displaying a second value associated with said second parameter of said subgroup after said first value is displayed for a predetermined period of time; and, repeating said step of displaying a first value and said step of displaying a second value after values associated with each parameter in said subgroup have been displayed.

2. The method of claim 1 wherein said second value is displayed for said predetermined period of time.

3. The method of claim 1 wherein said step of selecting a first parameter includes the substeps of:

accessing said first parameter in a memory; and marking said first parameter.

4. The method of claim 1 further comprising the step of setting a scroll enable flag.

5. The method of claim 4 wherein said setting step includes the substeps of:

accessing said scroll enable flag in a memory; and modifying said scroll enable flag.

6. The method of claim 1, further comprising the substep of activating a scrolling program in a memory.

7. The method of claim 1, further comprising the steps of:

selecting a third parameter from said plurality of operating parameters using said user interface, said subgroup including said third parameter; and, automatically displaying a third value associated with said third parameter of said subgroup after said second value is displayed.

8. A method of operating a motor system controller having a plurality of operating parameters associated therewith, comprising the steps of:

selecting a first parameter from said plurality of operating parameters using a user interface;

selecting a second parameter from said plurality of operating parameters using said user interface to thereby form a modifiable subgroup of actively displayable parameters;

setting a scroll enable flag;

activating a scrolling program;

displaying a first value associated with said first parameter of said subgroup;

automatically displaying a second value associated with said second parameter of said subgroup after said first value is displayed for a predetermined period of time; and, repeating said step of displaying a first value and said step of displaying a second value after values associated with each parameter in said subgroup have been displayed.

9. The method of claim 8 wherein said second value is displayed for said predetermined period of time.

10. The method of claim 8 wherein said step of selecting said first parameter includes the substeps of:

accessing said first parameter in a memory; and marking said first parameter.

11. The method of claim 8 wherein said setting step includes the substeps of:

accessing said scroll enable flag in a memory; and modifying said scroll enable flag.

12. The method of claim 8, further comprising the steps of:

selecting a third parameter from said plurality of operating parameters using said user interface, said subgroup including said third parameter; and, automatically displaying a third value associated with said third parameter of said subgroup after said second value is displayed.

13. A motor system controller, comprising:

means for selecting a first parameter and a second parameter from a plurality of operating parameters associated with said motor system controller to thereby form a modifiable subgroup of actively displayable parameters; and means for displaying a first value and a second value associated with said first parameter and said second parameter of said subgroup, respectively, wherein said second value is automatically displayed after said first value is displayed for a predetermined period of time and said first value is again displayed after values associated with each parameter in said subgroup have been displayed.

14. The motor system controller of claim 13 wherein said selecting means includes an operator keypad.

15. The motor system controller of claim 13 wherein said displaying means includes a liquid crystal display.

16. The motor system controller of claim 13, further comprising a memory having a scrolling program.

17. The motor system controller of claim 13 wherein said second value is displayed for said predetermined period of time.

18. The controller of claim 13 wherein said selecting means includes means for selecting a third parameter from said plurality of operating parameters associated with said motor system controller, said subgroup including said third parameter, and said displaying means includes means for displaying a third value associated with said third parameter of said subgroup, said third value automatically displayed after said second value is displayed.

* * * * *